UNITED STATES PATENT OFFICE.

ALFRED W. BOSWORTH, OF MILTON, MASSACHUSETTS, ASSIGNOR TO THE BOSTON FLOATING HOSPITAL, OF BOSTON, MASSACHUSETTS, A CORPORATION OF MASSACHUSETTS.

MILK-SERUM POWDER AND PROCESS OF MAKING SAME.

1,246,858.  Specification of Letters Patent.  Patented Nov. 20, 1917.

No Drawing.  Application filed August 9, 1917.  Serial No. 185,323.

*To all whom it may concern:*

Be it known that I, ALFRED W. BOSWORTH, a citizen of the United States, residing at Milton, in the county of Norfolk and State of Massachusetts, have invented certain new and useful Improvements in Milk-Serum Powders and Processes of Making Same, of which the following is a specification.

Underlying the present invention is the observation that milk from the cow or any of the lower animals when used as a food for infants contains an excessive amount of calcium and other mineral salts, which interfere with the proper digestion or assimilation of all the other food elements present in such a milk, and often results in serious intestinal and nutritional disturbances; also the observation that the removal of the excess of calcium from the milk, by a process which I have devised, results in an almost complete digestibility and assimilability of all the remaining food elements.

My invention relates to the production of a serum from milk, and has for its object the production of a powder from this serum in form which is completely and readily soluble in water and fit for use as a food, by a process which shall remove all the fat, all the casein, all but a trace of the calcium, and all but a trace of the inorganic phosphorus from the original milk, leaving a milk serum which shall contain no substance in kind or quantity foreign to the original milk, and which shall contain all the sugar, all the albumin and all the salts (except the calcium and phosphorus removed as mentioned above) of the original milk, and enable me to reduce this serum to a powder, which powder or the milk or serum from which it has been derived, shall not have been heated at any stage of the process to a temperature high enough to destroy or to decompose any of the so-called vitamins or food accessories which are or may be present in the serum.

In carrying out my process, starting from raw, fresh milk, I preferably employ five steps, broadly stated as follows:

First, removal of the milk fat;
Second, removal of the casein;
Third, neutralization to the required degree of acidity to precipitate calcium phosphate;
Fourth, removal of the precipitated calcium phosphate by filtration;
Fifth, desiccation at a low temperature.

By my process, most of the fat is removed from fresh milk by the well known method of centrifugalization.

The resulting fat-free or nearly fat-free milk is treated in the following manner to remove the casein: The milk is brought to a temperature of about 35° centigrade (unless already at that temperature), and enough of a 2.5% solution of phosphoric acid ($H_3PO_4$) is then added to just completely precipitate all the casein, an excess of the acid being carefully avoided, as such excess would cause some of the casein to redissolve. It is not possible to state the exact amount of acid necessary to precipitate the casein from the fat-free milk, as this amount will depend upon the original acidity of the milk, and the amount of casein in the fat-free milk, factors which will vary with each lot of milk. Usually (with fresh milk) about 1000 cubic centimeters of the 2.5% phosphoric acid solution will be required for eight lighters of milk.

The precipitated casein should separate out in large flocculent masses, after which the liquid is drawn off and filtered to remove the finely suspended particles of casein remaining in it. The small amount of fat remaining in the milk will be removed during this process of precipitation and filtration of the casein.

The degree of acidity of the filtered serum is now determined (*e. g.* by titrating 100 cubic centimeters with tenth normal sodium hydroxid, using phenolphthalein as the indicator, each cubic centimeter of the sodium hydroxid solution being equivalent to one degree of acidity). The tenth normal solution of sodium hydroxid is made by dissolving four grams of sodium hydroxid in enough distilled water to give 1000 cubic centimeters of solution.

Enough of a 4% milk of lime is now added to reduce the acidity, which is primarily due to phosphoric acid and acid phosphates, to two degrees (*i. e.* 100 cc. requiring 2 cc. of $n/10$ alkali to make it neutral to phenolphthalein.) Care must be taken not to add enough milk of lime to make the serum neutral or alkaline, for this will cause a precipitation of calcium citrate, a condition to be avoided. A 4% milk of lime may conveniently be prepared by slaking 40 grams of quick lime, calcium oxid, with distilled water, and making the total volume up to 1000 cubic centimeters with distilled water. This milk of lime should be thoroughly agitated just before using.

The addition of milk of lime results in a precipitation of insoluble calcium phosphate, and the serum with the precipitated calcium phosphate should be allowed to stand for about 30 minutes, with occasional agitation, in order that an equilibrium may be established which will accomplish the precipitation of the greatest amount of calcium phosphate.

It will be understood that the strengths of the phosphoric acid and milk of lime here mentioned are given purely by way of example, and that the said materials may be more dilute or more concentrated, so long as phosphoric acid is added to the required degree of acidity and that the milk of lime is added to the required degree of neutrality.

The precipitated calcium phosphate is removed (e. g. by filtering), and the final clear liquid is desiccated at a temperature below 65° C. This may be accomplished by the use of any of the well known forms of drying apparatus (for example, vacuum evaporators), or preferably by placing the liquid in a shallow flat-bottomed dish which rests upon a steam bath, and regulating the temperature of the serum by blowing a current of air over or through it. By regulating the air current the temperature of the evaporating liquid can be readily maintained at about 65° C., and the drying quickly effected.

The dry white mass obtained by desiccating the serum is now removed from the drying or desiccating apparatus and ground to a fine powder by means of a grinding mill.

The essential features of my invention are accordingly seen to be:

The production of a milk serum which shall contain no substance in kind or quantity foreign to the original milk, by a process which enables me to remove all the casein from the milk, after the fat has been removed, by the use of phosphoric acid, the phosphoric acid used for this precipitation being removed from the serum after the casein has been filtered off, by the use of calcium hydroxid, the calcium hydroxid added, together with most of the calcium originally present in the milk, uniting with the phosphoric acid to form insoluble calcium phosphate which is precipitated out and is removed by filtration;

The desiccation of the serum so prepared, in such a manner as to retain all the other constituents of the serum except the water, and give a milk serum powder which is readily and completely soluble in water and is in a form fit for use as food, especially as a constituent of infants' food;

The desiccation of the serum so prepared, in such a manner as to retain all the other constituents of the serum except the water, and at such a low temperature as to prevent the destruction of the vitamins or food accessories present in the serum, and to give a milk serum powder which contains all the vitamins or food accessories present in the serum and in a form fit for use as a food, especially as a constituent of infants' food.

The product of my process, dried milk serum, contains no substance in kind or quantity foreign to the original milk, is found to consist substantially of those ingredients of the original milk which have not been removed, all in a readily digestible condition, and the product will keep, without change, for an almost indefinite time.

Without limiting the invention to these exact figures, I give the following analysis of a sample produced in accordance with the process:

| | |
|---|---|
| Moisture | 1.0% |
| Nitrogenous compounds (proteins and vitamins) | 9.3% |
| Organic acids, (in part citric acid) | 5.2% |
| Lactose | 79.0% |
| Ash | 6.1% |
| | 101.1% |
| Oxygen equivalent to citric and other organic acids | 1.1% |
| Total | 100.0% |

Mineral elements present are as follows:

| | |
|---|---|
| Phosphorus pentoxid ($P_2O_5$) | 0.09 % |
| Chlorin | 1.53 % |
| Calcium oxid (CaO) | 0.34 % |
| Magnesium oxid (MgO) | 0.41 % |
| Potassium oxid ($K_2O$) | 2.80 % |
| Sodium oxid ($Na_2O$) | 1.34 % |
| Iron oxid ($Fe_2O_3$) | 0.028% |
| | 6.538% |
| Oxygen equivalent to chlorin | 0.345% |
| Total ash | 6.193% |

Having thus described my invention what I claim is:—

1. A process of making dried milk serum, which comprises removing the fat, the casein, and all but a trace of the calcium and inorganic phosphates from the milk without decomposing any material part of the vitamins or food accessories; and thereafter drying the same while at a temperature too low to decompose any substantial amount of the vitamins or food accessories contained.

2. A process of treating milk which comprises removing the bulk of the fats therefrom, adding phosphoric acid in sufficient quantity to precipitate substantially all the casein, and without material excess, adding milk of lime sufficient to reduce the acidity to an equivalent of about 2 cc. of $n/10$ alkali per 100 cc., and causing a precipitation of calcium phosphate thereby; thereafter filtering; and finally drying the remaining liquid at a temperature too low to injure or decompose any material part of the vitamins or food accessories or soluble organic constituents, substantially as described.

3. In the process of claims 1 and 2, the step of drying the serum by heating the said liquid and maintaining its temperature at about 65° C. by treating the said liquid with a regulated current of air.

4. A process of making dried milk serum which consists in removing the fats and casein from the milk, thereafter removing the calcium compounds from the serum thus produced, and finally drying the calcium-free serum.

5. That step in the process of producing a milk serum which consists in removing substantially all of the calcium content of the milk.

6. That step in the process of producing a milk serum which consists in removing substantially all of the calcium content of the milk by the addition of milk of lime to a previously acidulated milk serum.

7. That step in the process of producing a milk serum which consists in removing substantially all of the calcium content of the milk from a fat and casein free and acidulated serum, by the addition of milk of lime thereto.

8. A dried milk serum characterized by the absence of calcium salts, said product being readily soluble in water, and containing substantially all of the water-soluble proteids, the vitamins or food accessories, the sugar, at least a considerable part of the organic acids, and at least a part of the ash constituents of milk serum, all in a substantially dry condition, stable at ordinary atmospheric temperatures, and readily digestible.

9. A dry milk serum having approximately the following analysis:

| | |
|---|---|
| Moisture | 1.5% |
| Nitrogenous compounds (proteins and vitamins) | 9.3% |
| Lactose | 79.0% |
| Organic acids including citric | 5.2% |
| Ash | 6.1% | said product being readily soluble in water, readily digestible, and containing the constituent compounds in their natural and undecomposed state.

10. As a new article of manufacture a dried and digestible powder formed from milk serum, said powder containing substantially all of the nutritive constituents of the milk other than the fats and casein, and being distinguishable by the absence of calcium compounds.

In testimony whereof I have signed my name to this specification.

ALFRED W. BOSWORTH.